(12) United States Patent
Nose

(10) Patent No.: US 7,801,429 B2
(45) Date of Patent: Sep. 21, 2010

(54) IMAGE TAKING APPARATUS

(75) Inventor: Syuji Nose, Asaka (JP)

(73) Assignee: FUJIFILM Corporation, Tokyo (JP)

(*) Notice: Subject to any disclaimer, the term of this patent is extended or adjusted under 35 U.S.C. 154(b) by 615 days.

(21) Appl. No.: 11/802,829

(22) Filed: May 25, 2007

(65) Prior Publication Data

US 2007/0274698 A1 Nov. 29, 2007

(30) Foreign Application Priority Data

May 26, 2006 (JP) ............... 2006-147076

(51) Int. Cl.
G03B 15/02 (2006.01)
G03B 7/00 (2006.01)
G03B 15/03 (2006.01)
G03B 7/099 (2006.01)

(52) U.S. Cl. .................... 396/61; 396/65; 396/157; 396/172

(58) Field of Classification Search ............... 396/61
See application file for complete search history.

(56) References Cited

U.S. PATENT DOCUMENTS 6,067,422 A * 5/2000 Tokunaga et al. .......... 396/157

FOREIGN PATENT DOCUMENTS

JP 2002-207159 A 7/2002
JP 2005-20341 A 1/2005

* cited by examiner

Primary Examiner—Melissa J Koval
(74) Attorney, Agent, or Firm—Sughrue Mion, PLLC

(57) ABSTRACT

An aspect of the present invention provides an image taking apparatus comprising a flash emission device, a flash control device which adjusts a flash emission amount at the time of image taking using flash, an automatic focusing device which automatically performs focusing of an image taking lens, a determination device which determines, based on data on focusing performed by the automatic focusing device, whether or not a shooting distance is shorter than a normal shooting distance range at the time of image taking using flash, and a sensitivity setting device which sets a camera sensitivity at the time of image taking using flash, the sensitivity setting device which sets a camera sensitivity lower than a standard camera sensitivity set in advance with respect to the normal shooting distance range if the determination device determines that the shooting distance is shorter.

4 Claims, 10 Drawing Sheets

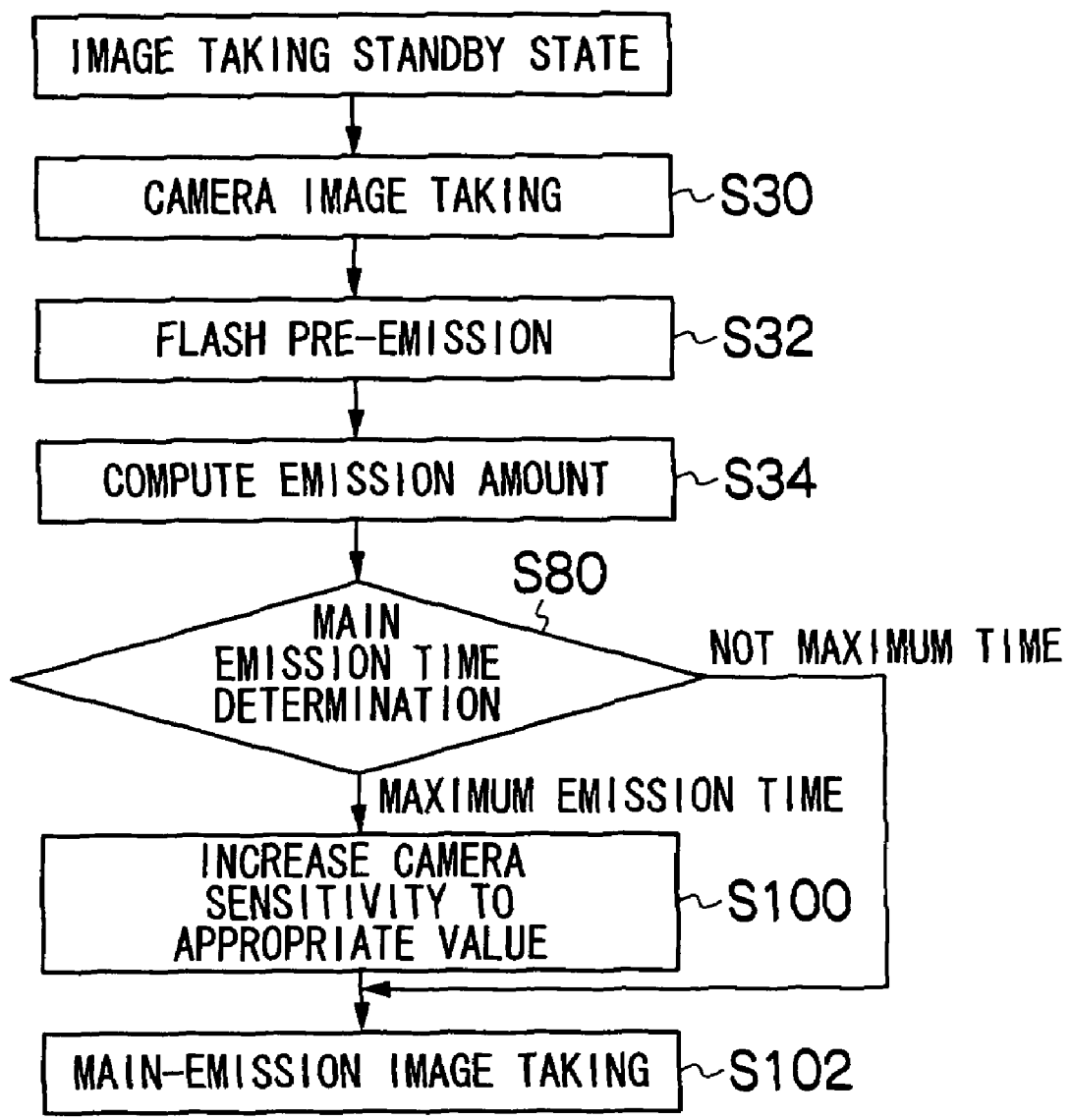

IMAGE TAKING APPARATUS

BACKGROUND OF THE INVENTION

1. Field of the Invention

The present invention relates to an image taking apparatus and, more particularly, to a technique of correcting overexposure or underexposure at the time of image taking using flash.

2. Description of the Related Art

In recent years, a digital camera has been proposed which has an increased camera sensitivity such that even a darkscene image can be taken without emitting flash (Japanese Patent Application Laid-Open No. 2005-20341).

In this digital camera, when the diaphragm stop is minimum (maximum aperture) and when the shutter speed becomes equal to or slower than a camera shake limit speed (e.g., 1/60 sec), the camera sensitivity is increased one step to maintain the shutter speed faster than the camera shake limit speed. When the upper limit value of the camera sensitivity is reached and when the shutter speed becomes equal to or slower than the camera shake limit speed, the shutter speed is maintained at the camera shake limit speed and the flashlight is fired.

A digital camera controlled so as to emit an optimum quantity of flash at the time of actual image taking while reducing the power consumption at the time of pre-emission of flash has also been proposed (Japanese Patent Application Laid-Open No. 2002-207159).

This digital camera has an automatic focusing device for performing automatic focusing based on an evaluation value representing the result of evaluation of contrast of an image, and obtains the accuracy of measurement of the shooting distance with the automatic focusing device (higher the evaluation value, higher the measurement accuracy). When the accuracy of measurement of the shooting distance is high, pre-emission of flash is prohibited and the quantity of flash to be emitted at the time of main emission is determined from the shooting distance, thus preventing wasting of energy by pre-emission.

SUMMARY OF THE INVENTION

In the digital camera described in Japanese Patent Application Laid-Open No. 2005-20341, emission of a small quantity of flash is required when high-sensitivity short-distance shooting is performed as image taking using flash. However, there is a limit to the minimum flash-controllable amount of light emission, so that a blown-out highlight due to overexposure can occur.

Also, in the case of a large-distance image taking, there is a problem that even flash produced by full flash emission cannot reach the subject.

The digital camera described in Japanese Patent Application Laid-Open No. 2002-207159 is designed to prevent wasting of energy by pre-emission by determining use/nonuse of pre-emission according to the accuracy of measurement of the shooting distance, and is not free from the blownout highlight problem or the like with high-sensitivity shortdistance shooting.

In view of the above-described circumstances, an object of the present invention is to provide an image taking apparatus capable of reducing the occurrence of blown-out highlights due to overexposure or the occurrence of a deficiency of light quantity during image taking using flash over a short distance or a long distance out of the range of shooting distance in the case of ordinary image taking using flash.

To achieve the above-described object, according to a first aspect of the present invention, there is provided an image taking apparatus comprising a flash emission device, a flash control device which adjusts a flash emission amount from the flash emission device at the time of image taking using flash, an automatic focusing device which automatically performs focusing of an image taking lens, a determination device which determines, based on data on focusing performed by the automatic focusing device, whether or not a shooting distance is shorter than a normal shooting distance range at the time of image taking using flash, and a sensitivity setting device which sets a camera sensitivity at the time of image taking using flash, the sensitivity setting device which sets a camera sensitivity lower than a standard camera sensitivity set in advance with respect to the normal shooting distance range if the determination device determines that the shooting distance is shorter.

In a case where the standard camera sensitivity at the time of image taking using flash is set to a comparatively high sensitivity, emission of a small quantity of flash is required at the time of high-sensitivity short-distance shooting. However, there is a limit to the minimum flash-controllable amount of light emission, and there is, therefore, a possibility of occurrence of a blown-out highlight due to overexposure. Therefore, if it is determined that the shooting distance at the time of image taking using flash is short, the camera sensitivity is set to a value lower than the standard camera sensitivity at the time of image taking using flash, thereby preventing overexposure. In a case where the standard camera sensitivity at the time of image taking using flash is set to a comparatively high value, the advantage of ensuring certain image taking performance with respect to a background object which cannot be reached by flash is obtained.

According to a second aspect of the present invention, there is provided an image taking apparatus comprising a flash emission device, a flash control device which adjusts a flash emission amount from the flash emission device at the time of image taking using flash, an automatic focusing device which automatically performs focusing of an image taking lens, a determination device which determines, based on data on focusing performed by the automatic focusing device, whether or not a shooting distance is longer than a normal shooting distance range at the time of image taking using flash, and a sensitivity setting device which sets a camera sensitivity at the time of image taking using flash, the sensitivity setting device which sets a camera sensitivity higher than a standard camera sensitivity set in advance with respect to the normal shooting distance range if the determination device determines that the shooting distance is longer.

Conversely to the case in the first aspect, flash cannot reach the subject if the shooting distance at the time of image taking using flash is long. In this case, however, the camera sensitivity is increased relative to the standard camera sensitivity to ensure that the shooting distance over which image taking using flash can be performed can be increased.

According to a third aspect of the present invention, in the image taking apparatus in the first or second aspect, the automatic focusing device performs focusing of the image taking lens by a contrast method and the determination device includes a detection device which detects the shooting distance based on a moved position of the image taking lens after the focusing. This kind of automatic focusing device does not directly measure the shooting distance, but the shooting distance can be roughly estimated from the position (focusing position) of the image taking lens after focusing.

According to a fourth aspect of the present invention, there is provided an image taking apparatus comprising a flash emission device, an emission amount computation device which makes the flash emission device perform pre-emission to a subject before image taking using flash to compute a flash emission amount under a standard camera sensitivity set in advance, based on reflected light from the subject at the time of pre-emission, a flash control device which adjusts the flash emission amount from the flash emission device so that the computed flash emission amount is obtained at the time of image taking using flash, and a sensitivity setting device which sets a camera sensitivity at the time of image taking using flash, the sensitivity setting device which sets a camera sensitivity reduced stepwise from the standard camera sensitivity when the flash emission amount computed by the emission amount computation device becomes equal to a minimum flash-controllable emission amount, wherein, when a camera sensitivity reduced stepwise from the standard camera sensitivity is set, the emission amount computation device recomputes a flash emission amount under the set camera sensitivity.

That is, a small amount of preliminary emission (pre-emission) set in advance is performed before main flash emission, and the amount of emission (emission time) at the time of main emission is computed based on the intensity of reflected light from the subject. If the computed flash emission amount is the minimum flash-controllable emission amount, there is a possibility of overexposure. Therefore, the camera sensitivity at the time of image taking using flash is reduced stepwise from the standard camera sensitivity; the flash emission amount under the reduced camera sensitivity is recomputed, and flash is controlled so that the recomputed emission amount is obtained at the time of main emission, thus preventing overexposure.

According to a fifth aspect of the present invention, there is provided an image taking apparatus comprising a flash emission device, an emission amount computation device which makes the flash emission device perform pre-emission to a subject before image taking using flash to compute a flash emission amount under a standard camera sensitivity set in advance, based on reflected light from the subject at the time of pre-emission, a flash control device which adjusts the flash emission amount from the flash emission device so that the computed flash emission amount is obtained at the time of image taking using flash, and a sensitivity setting device which sets a camera sensitivity at the time of image taking using flash, the sensitivity setting device which reduces the set camera sensitivity from the standard camera sensitivity to an appropriate value when the flash emission amount computed by the emission amount computation device becomes equal to a minimum flash-controllable emission amount.

In the fifth aspect of the present invention, if the computed flash emission amount is the minimum flash-controllable emission amount, the flash emission amount at the time of main emission is set to the minimum emission amount, and the camera sensitivity at the time of image taking using flash is reduced to appropriate camera sensitivity, thereby preventing overexposure.

According to a sixth aspect of the present invention, there is provided an image taking apparatus comprising a flash emission device, an emission amount computation device which makes the flash emission device perform pre-emission to a subject before image taking using flash to compute a flash emission amount under a standard diaphragm stop set in advance, based on reflected light from the subject at the time of pre-emission, a flash control device which adjusts the flash emission amount from the flash emission device so that the computed flash emission amount is obtained at the time of image taking using flash, and a diaphragm control device which controls a diaphragm on a lens at the time of image taking using flash, the diaphragm control device which controls the diaphragm so that the standard diaphragm stop is reached, until the flash emission amount computed by the emission amount computation device becomes equal to a minimum flash-controllable emission amount, and which, when the minimum flash-controllable emission amount is reached, controls the diaphragm stepwise so that a diaphragm stop larger than the standard diaphragm stop is set, wherein, when the diaphragm is controlled stepwise so that a diaphragm stop larger than the standard diaphragm stop is set, the emission amount computation device recomputes a flash emission amount under the controlled diaphragm stop.

In the fourth aspect of the present invention, the camera sensitivity is reduced from the standard camera sensitivity when the flash emission amount computed by the emission amount computation device becomes equal to the minimum flash-controllable emission amount. In the sixth aspect of the present invention, not the camera sensitivity but the diaphragm is controlled stepwise so that the diaphragm stop is set to a value larger than the standard diaphragm value, thereby preventing overexposure.

According to a seventh aspect of the present invention, there is provided an image taking apparatus comprising a flash emission device, an emission amount computation device which makes the flash emission device perform pre-emission to a subject before image taking using flash to compute a flash emission amount under a standard diaphragm stop for a lens set in advance, based on reflected light from the subject at the time of pre-emission, a flash control device which adjusts the flash emission amount from the flash emission device so that the computed flash emission amount is obtained at the time of image taking using flash, and a diaphragm control device which controls a diaphragm on the lens at the time of image taking using flash, the diaphragm control device which controls the diaphragm so that the standard diaphragm stop is reached, until the flash emission amount computed by the emission amount computation device becomes equal to a minimum flash-controllable emission amount, and which, when the minimum flash-controllable emission amount is reached, controls the diaphragm so that the diaphragm stop is changed from the standard diaphragm stop to an appropriate value.

In the seventh aspect of the present invention, if the computed flash emission amount is the minimum flash-controllable emission amount, the flash emission amount at the time of main emission is set to the minimum emission amount, and the diaphragm is controlled so that the diaphragm stop is changed from the standard diaphragm stop to an appropriate value, thereby preventing overexposure.

According to an eighth aspect of the present invention, there is provided an image taking apparatus comprising a flash emission device, an emission amount computation device which makes the flash emission device perform pre-emission to a subject before image taking using flash to compute a flash emission amount under a standard camera sensitivity set in advance, based on reflected light from the subject at the time of pre-emission, a flash control device which adjusts the flash emission amount from the flash emission device so that the computed flash emission amount is obtained at the time of image taking using flash, and a sensitivity setting device which sets a camera sensitivity at the time of image taking using flash, the sensitivity setting device which sets a camera sensitivity increased stepwise from the standard camera sensitivity when the flash emission amount computed by the emission amount computation device becomes equal to a maximum flash-controllable emission amount, wherein, when a camera sensitivity increased stepwise from the standard camera sensitivity is set, the emission amount computation device recomputes a flash emission amount under the set camera sensitivity.

That is, when the flash emission amount at the time of image taking using flash becomes equal to the maximum flash-controllable emission amount, there is a possibility of failure to cause flash to reach the subject. By considering such a case, the camera sensitivity set at the time of image taking using flash is increased stepwise from the standard camera sensitivity and the flash emission amount under the camera sensitivity increased stepwise is recomputed. The shooting distance over which image taking using flash can be performed can be increased in this way.

According to a ninth aspect of the present invention, there is provided an image taking apparatus comprising a flash emission device, an emission amount computation device which makes the flash emission device perform pre-emission to a subject before image taking using flash to compute a flash emission amount under a standard camera sensitivity set in advance, based on reflected light from the subject at the time of pre-emission, a flash control device which adjusts the flash emission amount from the flash emission device so that the computed flash emission amount is obtained at the time of image taking using flash, and a sensitivity setting device which sets a camera sensitivity at the time of image taking using flash, the sensitivity setting device which sets a camera sensitivity increased stepwise from the standard camera sensitivity when the flash emission amount computed by the emission amount computation device becomes equal to a maximum flash-controllable emission amount, wherein, when a camera sensitivity increased stepwise from the standard camera sensitivity is set, the emission amount computation device makes the flash emission device again perform pre-emission under the set camera sensitivity to recompute a flash emission amount under the set camera sensitivity based on reflected light from the subject at the time of pre-emission.

In the ninth aspect of the present invention, when the flash emission amount computed by the emission amount computation device becomes equal to the maximum flash-controllable emission amount, a camera sensitivity increased stepwise from the standard camera sensitivity is set, pre-emission is again performed under the set camera sensitivity, and the flash emission amount at the time of actual image taking. The shooting distance over which image taking using flash can be performed can be increased in this way. Also, the flash emission amount can be computed with improved accuracy in comparison with the eighth aspect.

According to a tenth aspect of the present invention, there is provided an image taking apparatus comprising a flash emission device, an emission amount computation device which makes the flash emission device perform pre-emission to a subject before image taking using flash to compute a flash emission amount under a standard camera sensitivity set in advance, based on reflected light from the subject at the time of pre-emission, a flash control device which adjusts the flash emission amount from the flash emission device so that the computed flash emission amount is obtained at the time of image taking using flash, and a sensitivity setting device which sets a camera sensitivity at the time of image taking using flash, the sensitivity setting device which increases the set camera sensitivity from the standard camera sensitivity to an appropriate value when the flash emission amount computed by the emission amount computation device becomes equal to a maximum flash-controllable emission amount.

In the tenth aspect of the present invention, when the computed flash emission amount is the maximum flash-controllable emission amount, the flash emission amount at the time of main emission is set to the maximum emission amount and the camera sensitivity at the time of image taking using flash is increased from the standard camera sensitivity to an appropriate value. The shooting distance over which image taking using flash can be performed can be increased in this way.

According to the present invention, blown-out highlights due to overexposure which occur at the time of image taking using flash over a distance shorter than the shooting distance range at the time of ordinary image taking using flash can be reduced and a deficiency of light quantity at the time of image taking using flash over a long distance can be reduced.

BRIEF DESCRIPTION OF THE DRAWINGS

FIG. 10 is a flowchart showing a ninth embodiment of the digital camera in accordance with the present invention.

DETAILED DESCRIPTION OF THE PREFERRED EMBODIMENTS

Preferred embodiments of the present invention will be described with reference to the accompanying drawings.

[Entire Configuration of Digital Camera]

Figure 1:
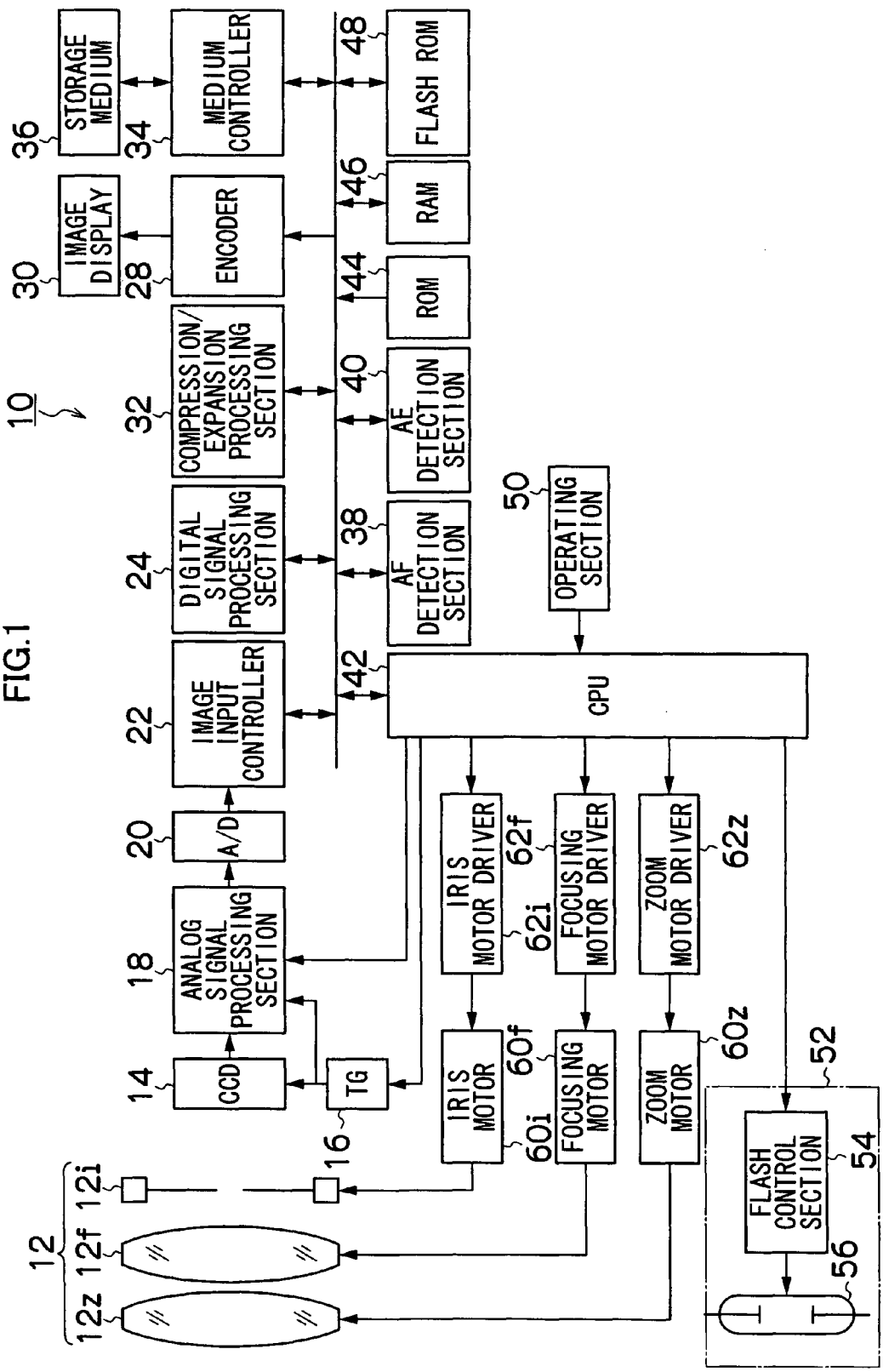
FIG. 1 is a block diagram showing an embodiment of the internal configuration of an image taking apparatus (digital camera) in accordance with the present invention.

FIG. 1 is a block diagram showing an embodiment of the internal configuration of an image taking apparatus (digital camera) 10 in accordance with the present invention.

As shown in FIG. 1, the digital camera 10 according to this embodiment is constituted by an image taking optical system 12, an image sensor 14 formed of a solid-stage image taking element such as a charge-coupled device (hereinafter referred to as "CCD 14"), a timing generator (TG) 16, an analog signal processing section 18, an A/D converter 20, an image input controller 22, a digital signal processing section 24, an encoder 28, an image display 30, a compression/expansion processing section 32, a medium controller 34, a storage medium 36, an automatic exposure (AE) detection section 38, an automatic focusing (AF) detection section 40, a central processing unit (CPU) 42, a read-only memory (ROM) 44, a random access memory (RAM) 46, a flash ROM 48, an operating section 50, and a flash device 52.

The operating section 50 includes a shutter button, a power switch, image taking/reproduction mode selection switch, a back switch, a menu/OK switch, and a cross key for multiple functions. The shutter button is a two-step stroke button having a switch S1 which, when half depressed, is turned to perform operations such as AF and AE for preparation of image taking, and a switch S2 which, when fully depressed, is turned on to take in an image.

The CPU 42 performs centralized control on the operation of the entire digital camera 10 and controls each section of the digital camera 10 according to a predetermined program based on an input from the operating section 50.

In the ROM 44, programs executed by the CPU 42 and data such as program diagrams necessary for various kinds of control are stored. The CPU 42 executes each of various kinds of processing by loading the corresponding program stored in the ROM 44 into the RAM 46 and by using the RAM 46 as a work memory. In the flash ROM 48 are stored various sorts of setting information relating to the operation of the digital camera 10, including user setting information.

The image taking optical system 12 includes a zoom lens 12z, a focusing lens 12f and a diaphragm (e.g., an iris diaphragm) 12i. The zoom lens 12z, the focusing lens 12f and the diaphragm 12i are operated by being driven by a zoom motor 60z, a focusing motor 60f and an iris motor 60i, respectively. That is, the zoom lens 12z is driven by the zoom motor 60z to move frontward or rearward on the image taking optical axis and to thereby change the focal length. The focusing lens 12f is driven by the focusing motor 60f to move frontward or rearward on the image taking optical axis and to thereby change the imaging position. The diaphragm 12i is driven by the iris motor 60i to change the opening continuously or stepwise and to thereby change the diaphragm stop. The CPU 42 controls drive of the zoom motor 60z, the focusing motor 60f and the iris motor 60i through a zoom motor driver 62z, a focusing motor driver 62f and an iris motor driver 62i and to thereby control the operations of the zoom lens 12z, the focusing lens 12f and the diaphragm 12i.

The CCD 14 is constituted by a color CCD having a predetermined color filter array (e.g., honeycomb array). Light reaching the light receiving surface of the CCD 14 after traveling through the image taking optical system 12 is converted into an amount of signal charge according to the its quantity by each of photodiodes arrayed in the light receiving surface. The signal charges accumulated in the photodiode are read out according to a timing signal applied to the CCD 14 from the timing generator (TG) 16 and are successively output as a voltage signal (image signal) from the CCD 14.

The CCD 14 has shutter gates and shutter drains. Shutter gate pulses are applied to the shutter gates to enable the signal charges accumulated in the photodiodes to be swept out to the shutter drains. The CPU 42 controls the application of shutter gate pulse to the shutter gates through the TG 16 to control the charge accumulation period during which signal charge is accumulated in each photodiode (the shutter speed determined by a so-called electronic shutter).

The analog signal processing section 18 includes a CDS circuit and an analog amplifier. The CDS circuit performs correlative double sampling processing on the CCD output signal based on CDS pulses applied from the TG 16. The analog amplifier amplifies an image signal output from the CDS circuit at a gain set according to camera sensitivity applied from the CPU 42. The AD converter 20 converts an analog image signal output from the analog signal processing section 18 into a digital image signal.

The image input controller 22 incorporates a buffer memory of a predetermined capacity, accumulates one frame of image signal output from the AD converter 20, and stores the accumulated image signal in the RAM 46.

The digital signal processing section 24 includes a white balance correction circuit, a gamma correction circuit, a synchronization circuit, a contour correction circuit, and a luminance/color difference signal generation circuit. The digital signal processing section 24 processes the image signal stored in the RAM 46 according to a command from the CPU 42 to generate a YUV signal formed of a luminance signal and a color difference signal.

A through image is displayed on the image display 30 as described below. The image signal obtained by continuously taking an image with the CCD 14 is continuously processed to generate the YUV signal. The generated YUV signal is applied to the encoder 28 via the RAM 46, converted into a signal format for display by the encoder 28, and thereafter output to the image display 30, thus displaying the through image on the image display 30.

An image is recorded as described below. An image is taken with the CCD 14 according to an image taking command from the shutter button. The obtained image signal is processed to generate the YUV signal. The generated YUV signal is applied to the compression/expansion processing section 32, converted into predetermined compressed image data (for example, in the JPEG format), and thereafter stored in the storage medium 36 through the medium controller 34.

The compressed image data stored in the storage medium 36 is read out from the storage medium 36 according to a reproduction command, converted into the uncompressed YUV signal by the compression/expansion processing section 32, and thereafter output to the image display 30 through the encoder 28. The image stored in the storage medium 36 is thus reproduced and displayed on the image display 30.

The AE detection section 38 computes physical quantities necessary for AE control from an input image signal according to a command from the CPU 42. For example, as physical quantities necessary for AE control, a totalized value of R, G and B image signals is computed with respect to each of a plurality of areas (e.g., 8×8) divided from one frame. The CPU 42 obtains an EV value by detecting the luminance of the subject based on the totalized value obtained from the AE detection section 38 and the diaphragm stop and the shutter speed when the image signal is obtained, and sets the exposure based on the obtained EV value and a program diagram or the like.

The AF detection section 40 computes a physical quantity necessary for AF control from an input image signal according to a command from the CPU 42. In the digital camera 10 according to this embodiment, AF control is performed based on contrast in an image and the AF detection section 40 computes an AF evaluation value indicating the sharpness of an image from an input image signal. The CPU 42 drives the focusing motor 60f through the focusing motor driver 62f so that the AF evaluation value computed by the AF detection section 40 is maximized, thereby controlling the movement of the focusing lens 12f.

The flash device 52 has a flash emitting section 54 including a xenon tube and a flash control section 56 which controls the quantity of flash emitted from the flash emitting section 54 according to an emission command and an emission stop command from the CPU 42 (emission time) and controls charging of a main capacitor not shown in the figure.

The flash device 52 operates according to a selected one of various flash modes such as an automatic flash mode in which flash is automatically emitted under a low-luminance condition, a forced flash emission mode, a red eye reduction flash mode and a flash emission prohibition mode.

The present invention will be described below with respect to a case where the quantity of flash emitted, the camera sensitivity and so on are controlled at the time of image taking using flash.

The flash device 52 in this embodiment has an image taking range of, for example, 1 to 3 m as a normal shooting distance range at the time of image taking using flash.

The camera sensitivity set by adjusting the gain of the analog amplifier in the analog signal processing section 18 can be set as desired in the range from ISO200 to ISO1600, and the standard camera sensitivity in the normal shooting distance range at the time of image taking using flash is set to a comparatively higher value of ISO800 to ensure certain image taking performance with respect to a background object which cannot be reached by flash at the time of image taking using flash.

Embodiments of the present invention will be described under the above-described assumptions.

First Embodiment

Figure 2:
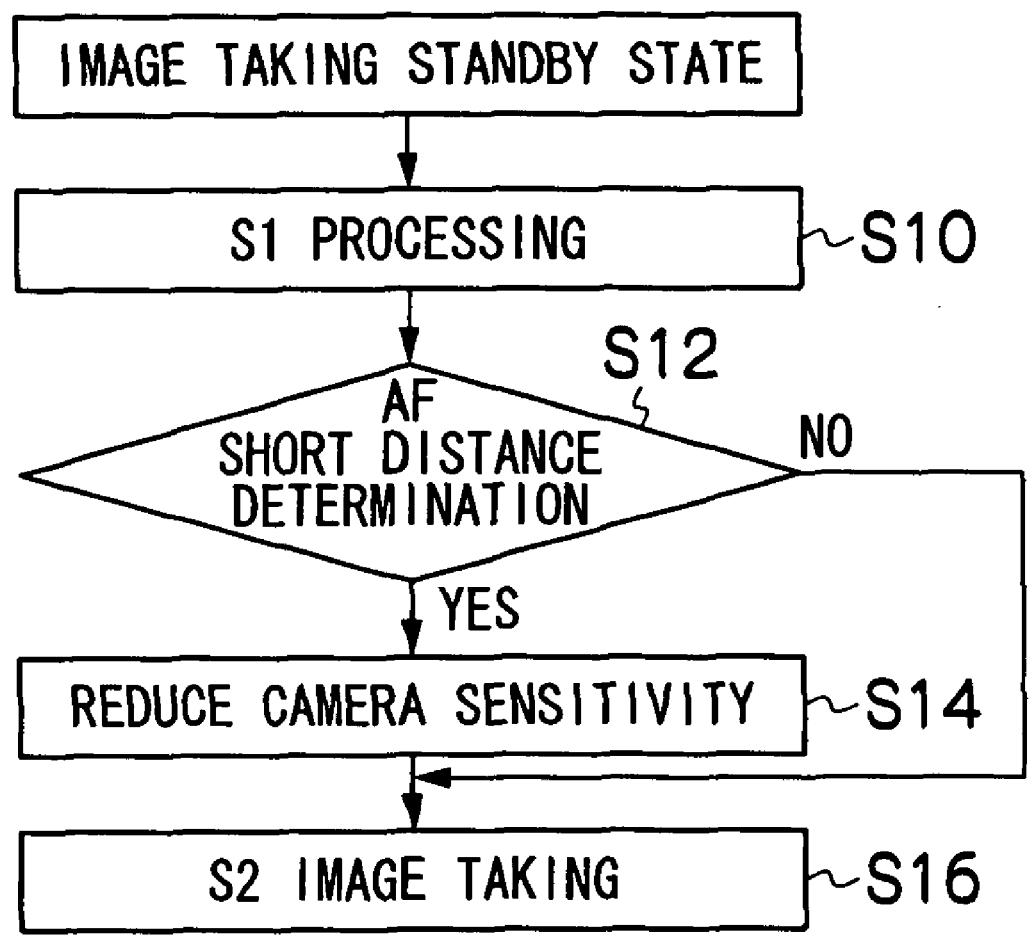
FIG. 2 is a flowchart showing a first embodiment of the digital camera in accordance with the present invention.

FIG. 2 is a flowchart showing a first embodiment of the digital camera 10 in accordance with the present invention.

When the shutter button is half depressed to turn on the switch S1 in an image taking standby state in the image taking mode, the CPU 42 performs S1 processing including AF and AE for preparation of image taking (step S10).

Subsequently, a target position (focusing position) to which the focusing lens 12$f$ to be moved by control based on contrast AF is detected. This focusing position detection can be performed by measuring the amount of rotation of the focusing motor 60$f$ from the home position of the focusing lens 12$f$ (e.g., the closest end) with a pulse encoder or the like, or by directly measuring the position of the focusing lens 12$f$ with a linear scale or the like.

The shooting distance is roughly determined based on the focusing position of the focusing lens 12$f$ detected as described above, and determination is made as to whether or not the shooting distance is short (step S12).

In this embodiment, a distance (shorter than 1 m) deviating on the shorter-distance side from the ordinary shooting distance range (1 to 3 m) is determined as short.

If it is determined in step S12 that the distance is short, the camera sensitivity is set to a sensitivity (e.g., ISO400) lower than the standard camera sensitivity (ISO800) (step S14).

If it is determined in step S12 that the distance is in the normal shooting distance range, the camera sensitivity is maintained at the standard camera sensitivity.

Thereafter, when the shutter button is fully depressed to turn on the switch S2, the CPU 42 initiates and controls image taking using flash (step S16). That is, the CPU 42 makes the flash device 52 perform pre-emission of a small amount of light set in advance, and performs photometry on reflected light from a subject through the CCD 14 and the AE detection section 38. The CPU 42 obtains the quantity of flash to be emitted at the time of main emission based on the measured photometric value, and outputs to the flash control section 54 in the flash device 52 an emission command and an emission stop command such that the emission time is set according to the obtained quantity of flash to be emitted.

According to the first embodiment, the camera sensitivity is set lower than the standard camera sensitivity at the time of short-distance shooting, thus enabling prevention of the occurrence of a blown-out highlight due to overexposure.

Second Embodiment

Figure 3:
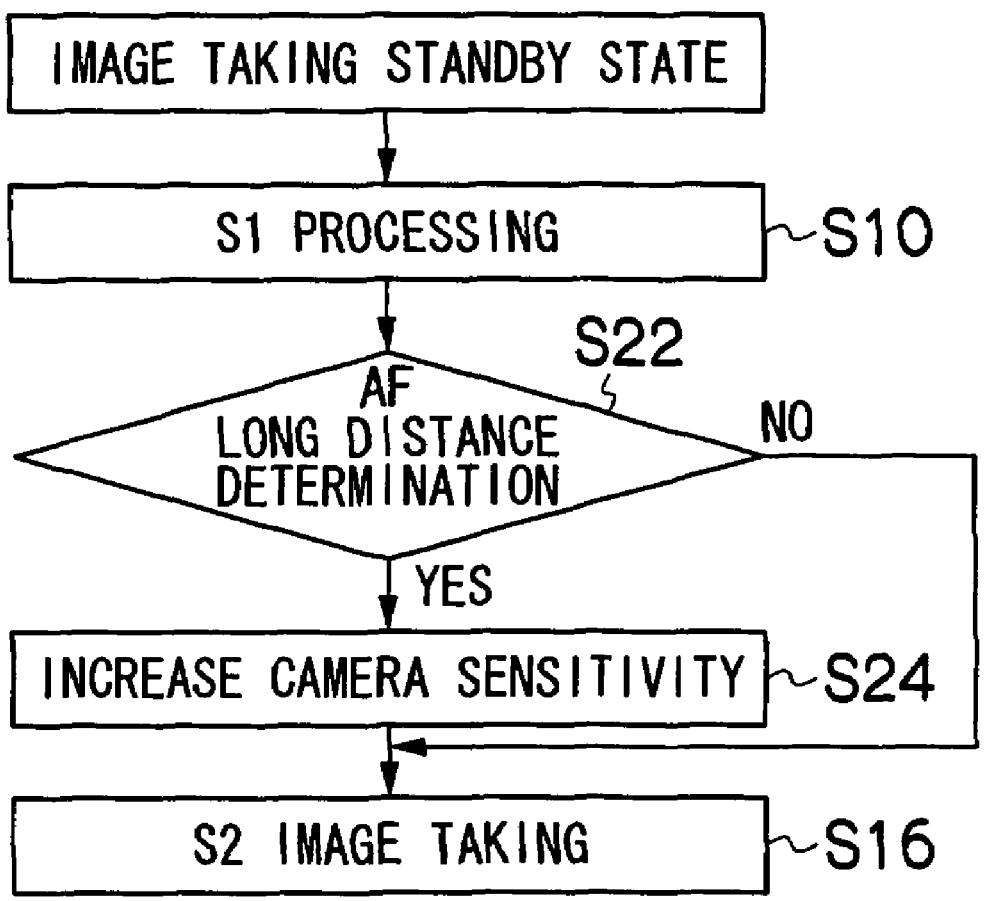
FIG. 3 is a flowchart showing a second embodiment of the digital camera in accordance with the present invention.

FIG. 3 is a flowchart showing a second embodiment of the digital camera 10 in accordance with the present invention. Steps in the second embodiment corresponding to those in the first embodiment shown in FIG. 2 are indicated by the same step numbers, and the detailed description for them will not be repeated.

In the second embodiment, steps S22 and S24 of processing are executed in place of steps S12 and S14 in the first embodiment.

That is, in step S22, determination is made as to whether or not the shooting distance roughly computed from the focusing position of the focusing lens 12$f$ is long. In this embodiment, a distance deviating on the longer-distance side from the ordinary shooting distance range (1 to 3 m) is determined as long.

If it is determined in step S22 that the distance is long, the camera sensitivity is set to a sensitivity (e.g., ISO1600) higher than the standard camera sensitivity (ISO800) in step S24.

According to the second embodiment, the camera sensitivity is set higher than the standard camera sensitivity at the time of long-distance shooting, thereby increasing the shooting distance over which image taking using flash can be suitably performed.

In the above-described first and second embodiments, the shooting distance is obtained from the focusing position of the focusing lens 12$f$ focusing-controlled at the time of contrast AF. However, the present invention is not limited to this. The shooting distance measured by a measuring device provided for AF according to a phase difference detection method, a triangular distance metering method or the like may alternatively be used.

The normal shooting distance range at the time of image taking using flash is assumed to the range from 1 to 3 m in the above description. However, the present invention is not limited to these embodiments. The normal shooting distance range may be changed depending on whether the lens is a wide-angle lens or a telephoto lens.

Further, a configuration according to a combination of the first and second embodiments may be adopted.

Third Embodiment

Figure 4:
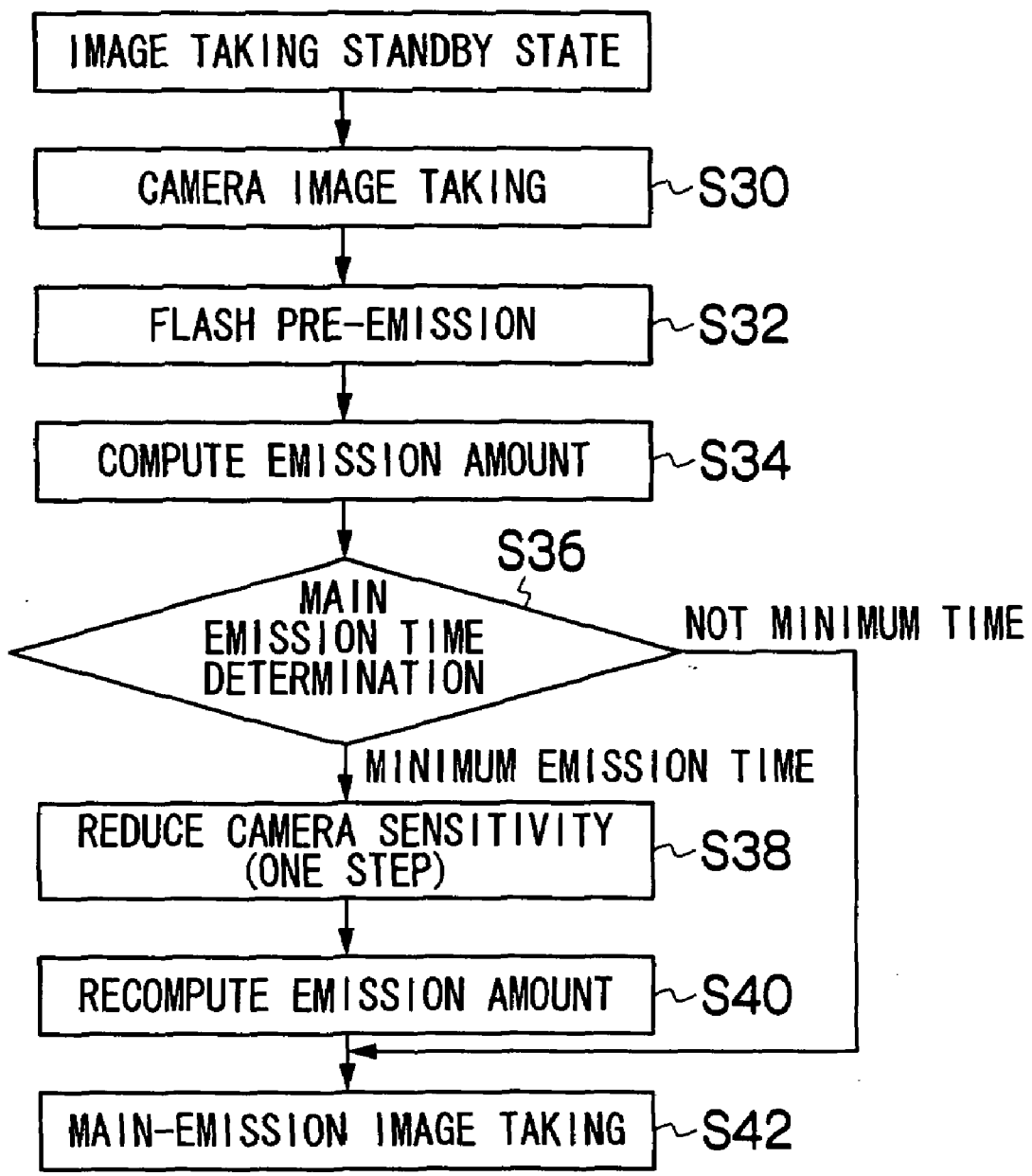
FIG. 4 is a flowchart showing a third embodiment of the digital camera in accordance with the present invention.

FIG. 4 is a flowchart showing a third embodiment of the digital camera 10 in accordance with the present invention.

When the shutter button is fully depressed to turn on the switch S2 in the image taking standby state in the image taking mode, the CPU 42 executes camera image taking (pre-emission image taking) and makes the flash device 52 perform pre-emission (steps S30 and S32). The camera sensitivity at the time of pre-emission image taking is set to the standard camera sensitivity at the time of image taking using flash (ISO800) in advance. Needless to say, S1 processing including AF and AE for preparation of image taking is performed when the shutter button is half depressed before being fully depressed.

Subsequently, photometry for measuring the intensity of reflected light from the subject based on image data obtained at the time of pre-emission image taking is performed and the necessary amount of emission for taking an image at a appropriate luminance at the time of main emission is computed based on the measured photometric value (step S34).

The emission time corresponding to the amount of emission computed as described above is thereafter obtained and determination is made as to whether or not the obtained emission time is the minimum flash-controllable emission time (step S36). The case where the emission time is the minimum corresponds to a case where the quantity of reflected light from the subject in the flash emitted by pre-emission is excessively large (the shooting distance is short).

If it is determined in step S36 that the emission time is the minimum, the camera sensitivity is set to the sensitivity (ISO400) one step lower than the standard camera sensitivity (ISO800) (step S38).

Subsequently, the necessary amount of emission for taking an image at an appropriate luminance at the time of main emission with the camera sensitivity set in step S38 is recomputed (step S40).

If it is determined in step S36 that the emission time is not the minimum, the camera sensitivity is maintained at the standard camera sensitivity.

At the time of image taking using flash produced by main emission, if it is determined in step S36 that the emission time is the minimum, the amount of emission from the flash device 52 is controlled so as to become equal to the amount of emission recomputed in step S40. If it is determined in step S36 that the emission time is not the minimum, the amount of emission from the flash device 52 is controlled so as to become equal to the amount of emission computed in step S34.

The arrangement may alternatively be such that if the emission time corresponding to the amount of emission recomputed in step S40 is the minimum flash-controllable emission time, the camera sensitivity is set to the sensitivity (ISO200) further one step lower and the amount of emission is recomputed. Also, a setting to the lowest camera sensitivity may be made in step S38.

According to the third embodiment, if the main emission time is determined as the minimum emission time, the camera sensitivity is set lower than the standard camera sensitivity, thus enabling prevention of the occurrence of a blown-out highlight due to overexposure.

Fourth Embodiment

Figure 5:
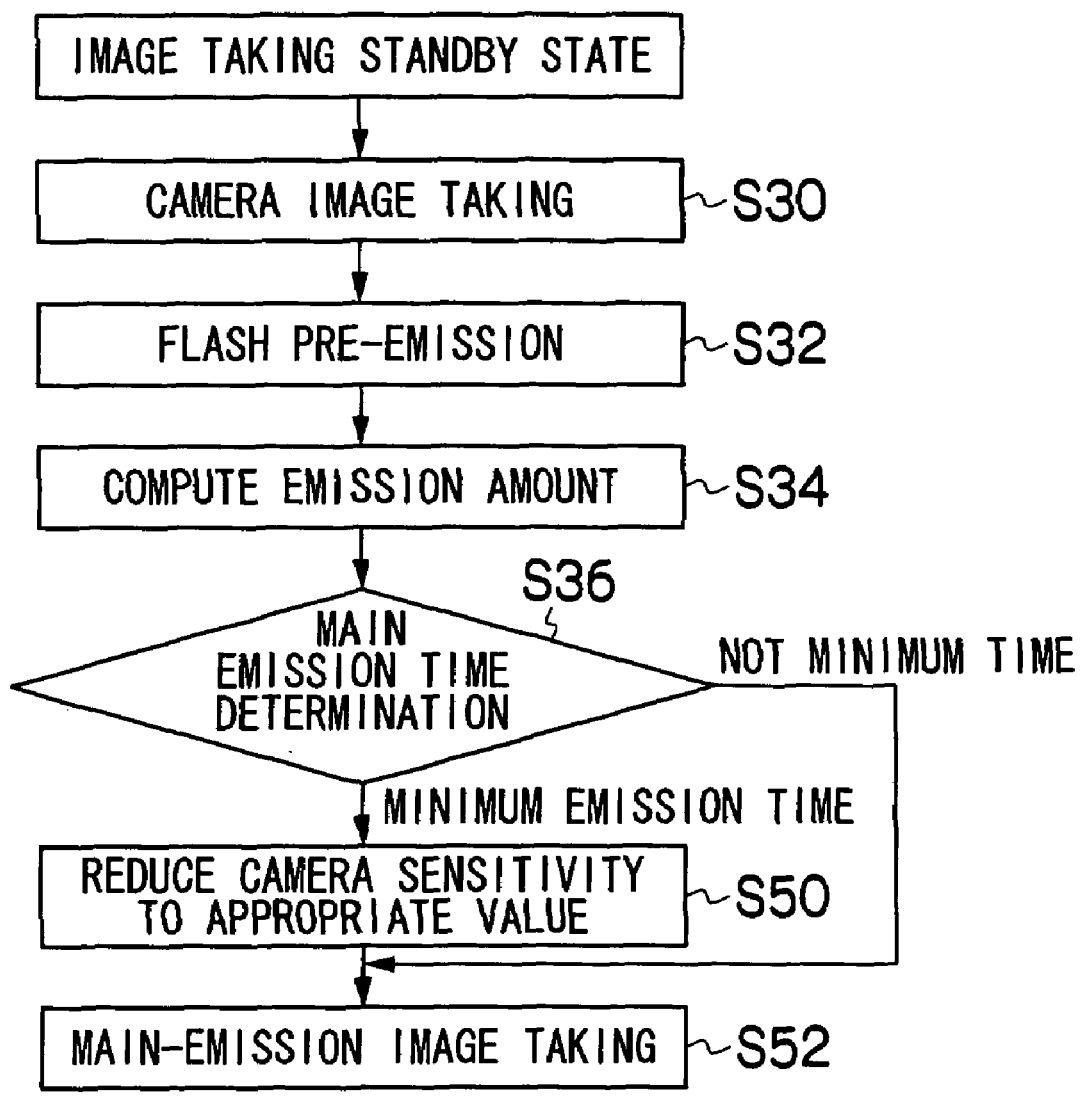
FIG. 5 is a flowchart showing a fourth embodiment of the digital camera in accordance with the present invention.

FIG. 5 is a flowchart showing a fourth embodiment of the digital camera 10 in accordance with the present invention. Steps in the fourth embodiment corresponding to those in the third embodiment shown in FIG. 4 are indicated by the same step numbers, and the detailed description for them will not be repeated.

In the fourth embodiment, steps S50 and S52 of processing are executed in place of steps S38, S40, and S42 in the third embodiment.

That is, in step S50, a camera sensitivity at the time of main-emission image taking which is lower than the standard camera sensitivity (ISO800) and at which an image having a appropriate luminance under the amount of emission during the minimum emission time can be taken and a camera sensitivity setting to this camera sensitivity obtained (correct value) is made.

At the time of main-emission image taking in step S52, the amount of emission from the flash device 52 is controlled so as to become equal to the amount of emission computed in step S34.

In the fourth embodiment, the amount of emission at the time of main-emission image taking is not changed from the amount of emission computed in advance and, if it is determined that the main emission time is the minimum, the camera sensitivity is reduced from the standard camera sensitivity to the correct value, thus enabling prevention of the occurrence of a blown-out highlight due to overexposure.

Fifth Embodiment

Figure 6:
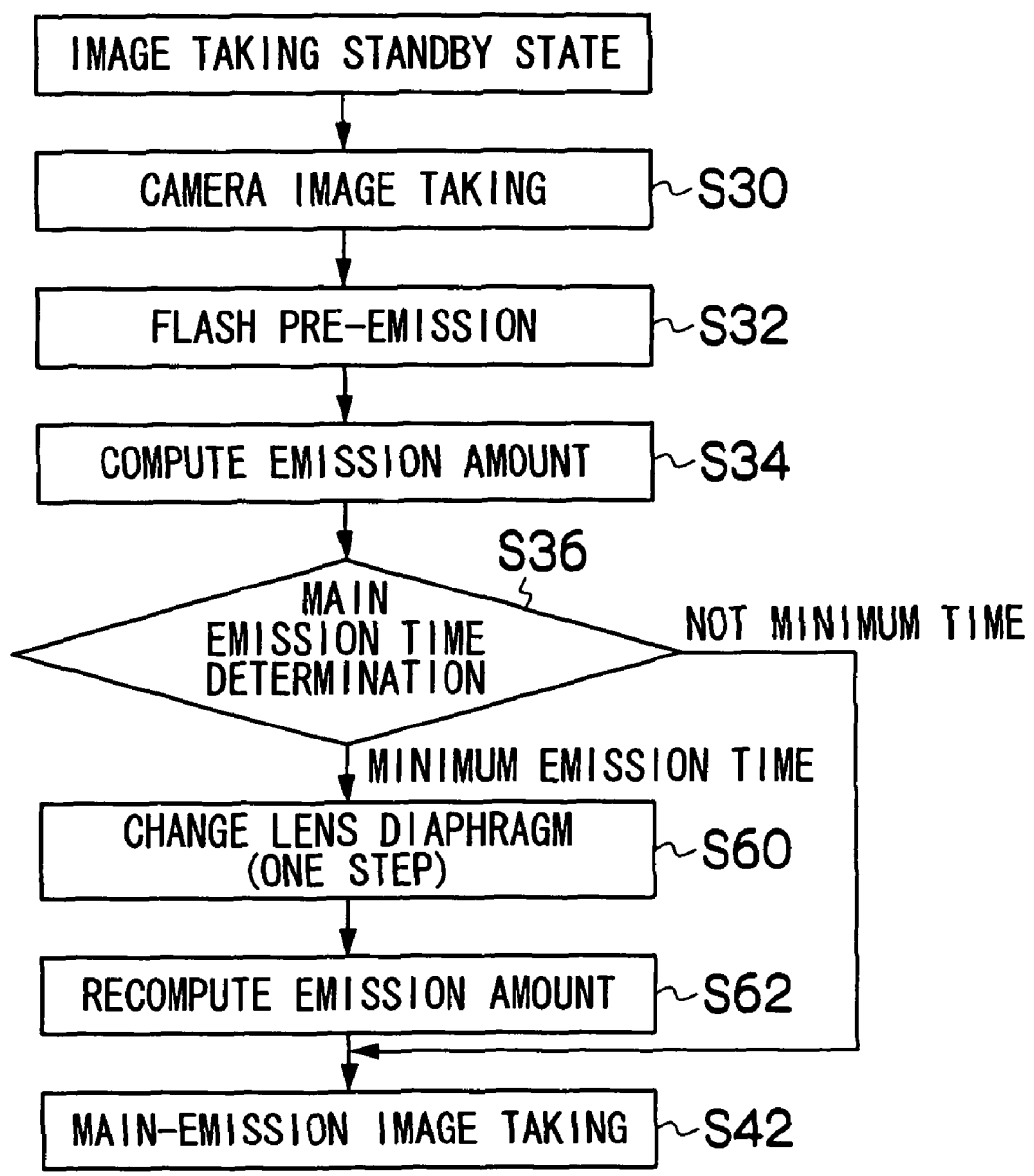
FIG. 6 is a flowchart showing a fifth embodiment of the digital camera in accordance with the present invention.

FIG. 6 is a flowchart showing a fifth embodiment of the digital camera 10 in accordance with the present invention. Steps in the fifth embodiment corresponding to those in the third embodiment shown in FIG. 4 are indicated by the same step numbers, and the detailed description for them will not be repeated.

In the fifth embodiment, steps S60 and S62 of processing are executed in place of steps S38 and S40 in the third embodiment.

That is, in step S60, the diaphragm 12$i$ is controlled so that the diaphragm stop is set to a value (F4) one step larger than the standard diaphragm stop (e.g., F2.8) at the time of image taking using flash (the opening of the diaphragm 12$i$ is reduced one step).

In step S62, the amount of flash emission is recomputed with respect to the diaphragm stop controlled in step S60.

According to the fifth embodiment, if it is determined that the main emission time is the minimum, the diaphragm 12$i$ is controlled so that the diaphragm stop of the diaphragm is larger than the standard diaphragm stop, thereby preventing the occurrence of a blown-out highlight due to overexposure.

The arrangement may be such that if the emission time corresponding to the amount of emission recomputed in step S62 is the minimum flash-controllable emission time, the diaphragm is controlled so that the diaphragm stop is further increased one step, and the amount of emission is recomputed. Also, the diaphragm may be controlled in step S60 so that the diaphragm stop is maximized.

Sixth Embodiment

Figure 7:
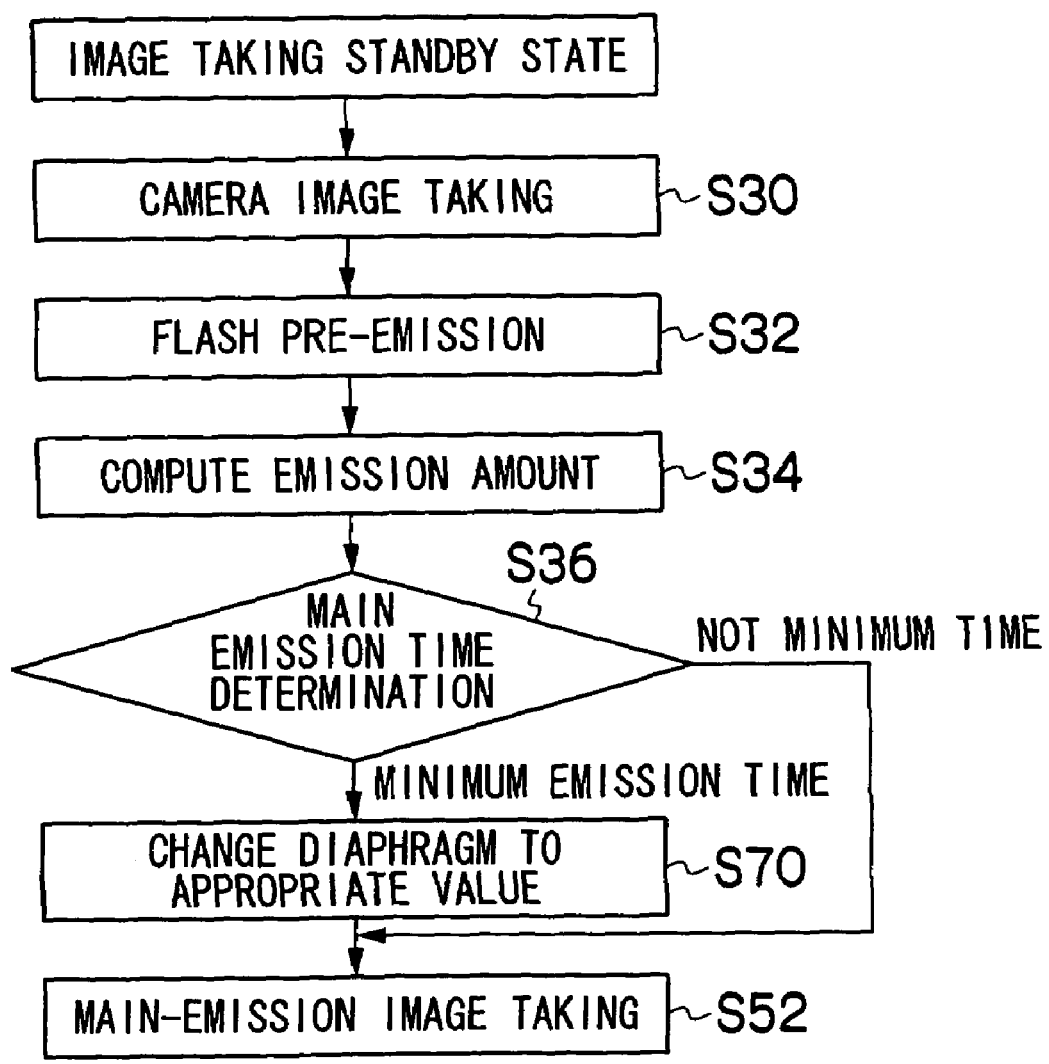
FIG. 7 is a flowchart showing a sixth embodiment of the digital camera in accordance with the present invention.

FIG. 7 is a flowchart showing a sixth embodiment of the digital camera 10 in accordance with the present invention. Steps in the sixth embodiment corresponding to those in the fourth embodiment shown in FIG. 5 are indicated by the same step numbers, and the detailed description for them will not be repeated.

In the sixth embodiment, step S70 of processing is executed in place of step S50 in the fourth embodiment.

That is, in step S70, a diaphragm stop which is larger than the standard diaphragm stop at the time of image taking using flash and at which an image having a appropriate luminance under the amount of emission during the minimum emission time can be taken, and the diaphragm 12$i$ is controlled to set this diaphragm stop obtained (correct value).

In the sixth embodiment, the amount of emission at the time of main-emission image taking is not changed from the amount of emission computed in advance and, if it is determined that the main emission time is the minimum, the diaphragm stop is controlled so as to be changed from the standard diaphragm stop to the correct value, thus enabling prevention of the occurrence of a blown-out highlight due to overexposure.

Since the diaphragm 12$i$ in this embodiment is an iris diaphragm, the above-described diaphragm control can be performed. However, this embodiment cannot be applied to a camera using such a type of diaphragm that a selection is made from a plurality of diaphragm apertures corresponding to predetermined different diaphragm stops.

Seventh Embodiment

Figure 8:
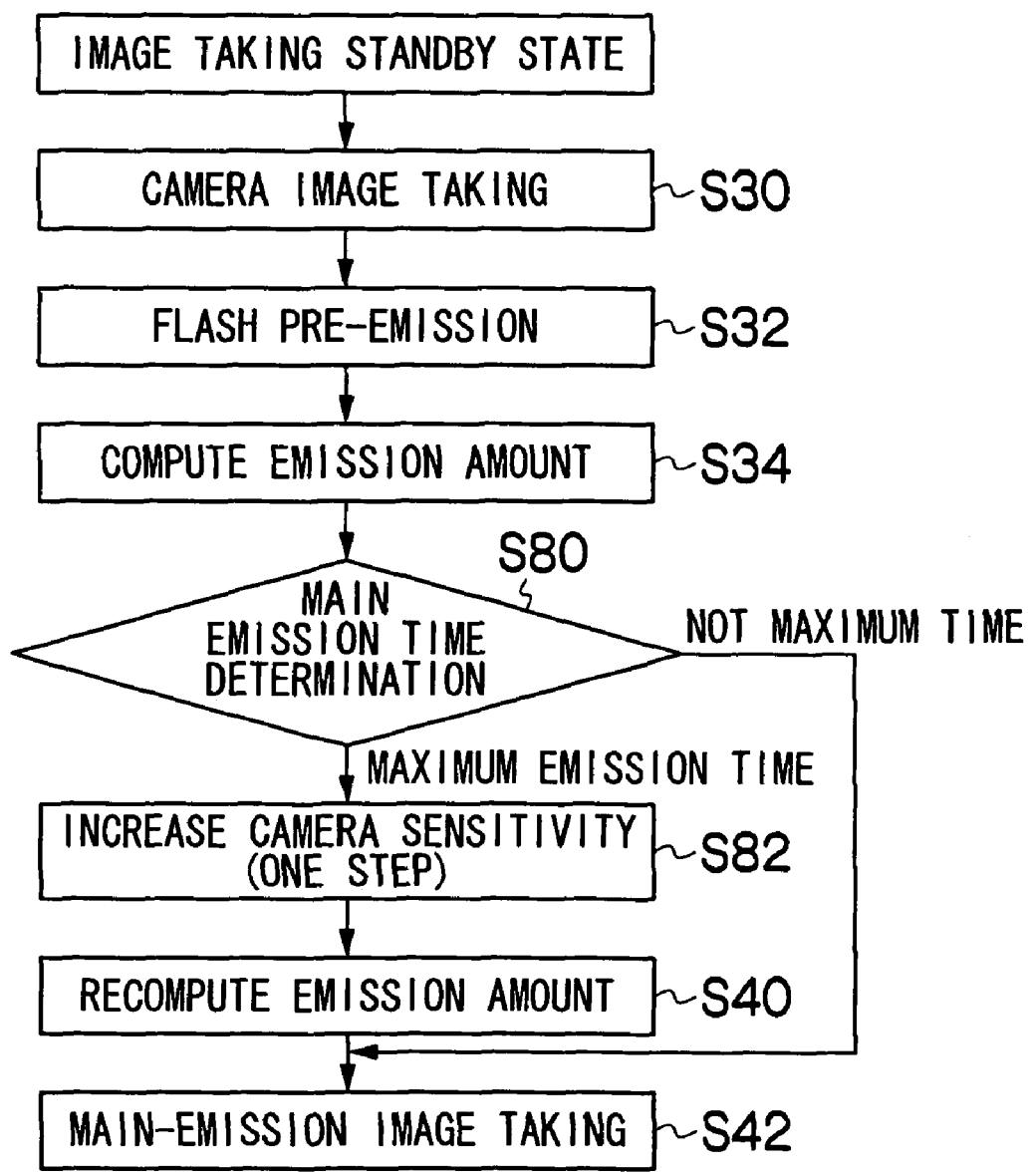
FIG. 8 is a flowchart showing a seventh embodiment of the digital camera in accordance with the present invention.

FIG. 8 is a flowchart showing a seventh embodiment of the digital camera 10 in accordance with the present invention. Steps in the seventh embodiment corresponding to those in the third embodiment shown in FIG. 4 are indicated by the same step numbers, and the detailed description for them will not be repeated.

In the seventh embodiment, steps S80 and S82 of processing are executed in place of steps S36 and S38 in the third embodiment.

That is, in step S80, determination is made as to whether the emission time corresponding to the emission amount computed in step S34 is the maximum flash-controllable emission time. The case where the emission time is the maximum corresponds to a case where the quantity of flash emitted to the subject by pre-emission is not sufficiently large (the shooting distance is long).

If it is determined in step S80 that the emission time is the maximum, the camera sensitivity is set to the sensitivity (IS1600) one step higher than the standard camera sensitivity (ISO800) (step S82).

According to the seventh embodiment, if the main emission time is determined as the maximum emission time, the camera sensitivity is set higher than the standard camera sensitivity, thus avoiding underexposure (that is, making it possible to increase the flash-controllable shooting distance).

Eighth Embodiment

Figure 9:
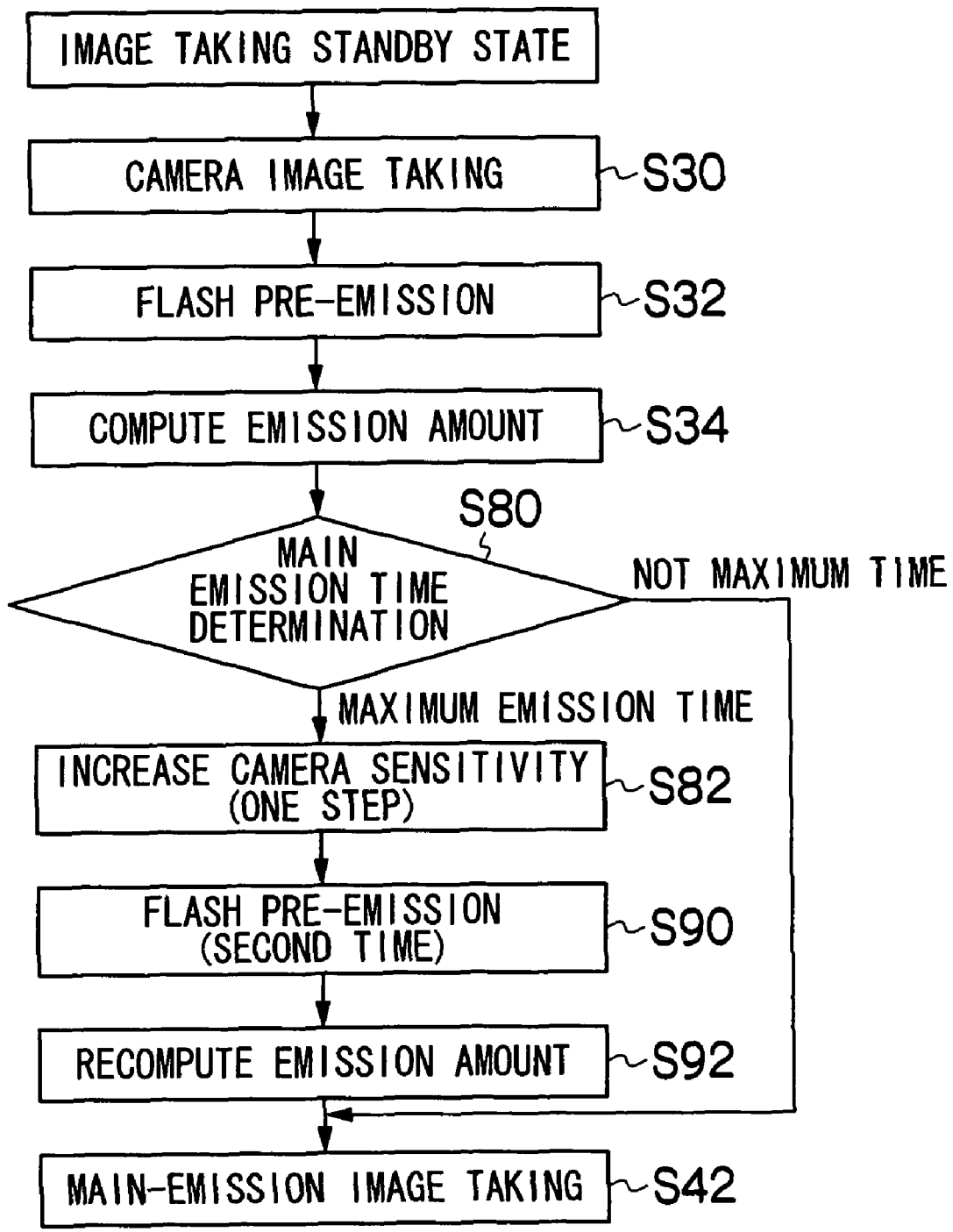
FIG. 9 is a flowchart showing an eighth embodiment of the digital camera in accordance with the present invention.

FIG. 9 is a flowchart showing an eighth embodiment of the digital camera 10 in accordance with the present invention. Steps in the seventh embodiment corresponding to those in the seventh embodiment shown in FIG. 8 are indicated by the same step numbers, and the detailed description for them will not be repeated.

The eighth embodiment differs from the seventh embodiment in that pre-emission is again performed after increasing the camera sensitivity in the case of determination of the maximum emission time. In the eighth embodiment, steps S90 and S92 of processing are executed in place of step S40 in the seventh embodiment.

That is, in step S90, pre-emission and pre-emission image taking are performed in the state where the camera sensitivity is one step higher than the standard camera sensitivity as the result of setting in step S82.

In step S92, photometry is performed for measuring the intensity of reflected light from the subject based on image data obtained at the time of pre-emission image taking and the necessary amount of emission for taking an image having a appropriate luminance with the camera sensitivity set in step S82 is computed based on the measured photometric value.

Since in this embodiment pre-emission image taking is performed in the state where the camera sensitivity is higher than that in the seventh embodiment, the amount of emission necessary at the time of main emission can be computed with improved accuracy.

Ninth Embodiment

FIG. 10 is a flowchart showing a ninth embodiment of the digital camera 10 in accordance with the present invention. Steps in the ninth embodiment corresponding to those in the seventh embodiment shown in FIG. 8 are indicated by the same step numbers, and the detailed description for them will not be repeated.

In the ninth embodiment, steps S100 and S102 of processing are executed in place of steps S82, S40, and S42 in the seventh embodiment.

That is, in step S100, a camera sensitivity at the time of main-emission image taking which is higher than the standard camera sensitivity (ISO800) and at which an image having a appropriate luminance under the amount of emission during the maximum emission time can be taken and a camera sensitivity setting to this camera sensitivity obtained (correct value) is made.

At the time of main-emission image taking in step S102, the amount of emission from the flash device 52 is controlled so as to become equal to the amount of emission computed in step S34.

In the ninth embodiment, the amount of emission at the time of main-emission image taking is not changed from the amount of emission computed in advance and, if it is determined that the main emission time is the maximum, the camera sensitivity is increased from the standard camera sensitivity to the correct value, thus increasing the flash-controllable shooting distance.

A configuration according to a suitable combination of one of the third to sixth embodiments and one of the seventh to ninth embodiments may be adopted.

What is claimed is:

1. An image taking apparatus comprising:
    an image taking device which converts light into a charge, wherein an amount of the charge corresponds to a quantity of the light, the charge is read out from the image taking device as an image signal;
    a flash emission device;
    a flash control device which adjusts a flash emission amount from the flash emission device at the time of image taking using flash;
    an automatic focusing device which automatically performs focusing of an image taking lens;
    a determination device which determines, based on data on focusing performed by the automatic focusing device, whether or not a shooting distance is shorter than a normal shooting distance range at the time of image taking using flash; and
    a sensitivity setting device which sets a camera sensitivity of the image taking device at the time of image taking using flash, the sensitivity setting device which sets a camera sensitivity lower than a standard camera sensitivity set in advance with respect to the normal shooting distance range if the determination device determines that the shooting distance is shorter.

2. The image taking apparatus according to claim 1, wherein the determination device determines, based on data on focusing performed by the automatic focusing device, whether or not the shooting distance is longer than the normal shooting distance range at the time of image taking using flash, and
    the sensitivity setting device sets a camera sensitivity higher than the standard camera sensitivity set in advance with respect to the normal shooting distance range if the determination device determines that the shooting distance is longer.

3. The image taking apparatus according to claim 1, wherein the automatic focusing device performs focusing of the image taking lens by a contrast method, and the determination device includes a detection device which detects the shooting distance based on a moved position of the image taking lens after the focusing.

4. The image taking apparatus according to claim 1, wherein
    the image taking device comprises an amplifier which amplifies the image signal at a gain which is set according to the camera sensitivity set by the sensitivity setting device.

* * * * *